United States Patent
Maresh et al.

(10) Patent No.: US 10,581,857 B2
(45) Date of Patent: Mar. 3, 2020

(54) CONTROLLING ACCESS TO A HOST SITE USING A PERSONAL IDENTIFICATION VIDEO

(71) Applicant: INTERNATIONAL BUSINESS MACHINES CORPORATION, Armonk, NY (US)

(72) Inventors: Mark E. Maresh, Wake Forest, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 183 days.

(21) Appl. No.: 15/807,756

(22) Filed: Nov. 9, 2017

(65) Prior Publication Data
US 2019/0141042 A1  May 9, 2019

(51) Int. Cl.
| G06F 7/04 | (2006.01) |
| H04L 29/06 | (2006.01) |
| G06K 9/00 | (2006.01) |
| G06K 9/62 | (2006.01) |
| G06F 21/36 | (2013.01) |

(52) U.S. Cl.
CPC .............. *H04L 63/10* (2013.01); *G06F 21/36* (2013.01); *G06K 9/00744* (2013.01); *G06K 9/00758* (2013.01); *G06K 9/6215* (2013.01); *H04L 63/0861* (2013.01); *H04L 63/102* (2013.01)

(58) Field of Classification Search
CPC ............... H04L 63/10; G06K 9/00758; G06K 9/00744; G06K 9/6215

USPC ........................................................ 726/7
See application file for complete search history.

(56) References Cited

U.S. PATENT DOCUMENTS

| 5,646,997 A | 7/1997 | Barton |
| 5,870,471 A | 2/1999 | Wootton et al. |
| 7,617,542 B2 | 11/2009 | Vataja |
| 7,856,234 B2 | 12/2010 | Alizadeh-Shabdiz et al. |

(Continued)

FOREIGN PATENT DOCUMENTS

WO      0051365 A2      8/2000

OTHER PUBLICATIONS

Bardram, Jakob E. et al. "Context-Aware User Authentication—Supporting Proximity-Based Login in Pervasive Computing", UbiComp 2003; LNCS 2864; 2003; pp. 107-123.

(Continued)

*Primary Examiner* — Mohammad W Reza
(74) *Attorney, Agent, or Firm* — Cantor Colburn LLP; Tihon Poltavets (57) ABSTRACT

Methods, systems and computer program products for controlling access to a host site are provided. Aspects include receiving, receiving an authentication video and processing the authentication video to identify a plurality of scenes. Aspects also include identifying a representative image for each of the plurality of scenes and comparing the representative image for each of the plurality of scenes with stored one of a plurality of master images. Based on a determination that a similarity between the representative image for each of the plurality of scenes and the one of the plurality of master images is between a first threshold level and second threshold level, aspects include granting access to the host site.

17 Claims, 5 Drawing Sheets

(56) References Cited

U.S. PATENT DOCUMENTS

| | | | |
|---|---|---|---|
| 8,090,945 | B2 | 1/2012 | Singhal |
| 8,176,159 | B2 | 5/2012 | Kashi |
| 8,630,657 | B2 | 1/2014 | Alizadeh-Shabdiz et al. |
| 8,941,741 | B1 * | 1/2015 | McDonough ...... G06K 9/00288 348/161 |
| 9,179,116 | B1 * | 11/2015 | Liao ..................... G11B 27/28 |
| 2007/0202888 | A1 | 8/2007 | Brachet et al. |
| 2008/0222038 | A1 | 9/2008 | Eden et al. |
| 2009/0232351 | A1 | 9/2009 | Kagitani et al. |

OTHER PUBLICATIONS

Capkun, Srdjan et al., "Secure positioning of wireless devices with application to sensor networks" INFOCOM 2005; 24th Annual Joint Conference of the IEEE Computer and Communications Societies; Proceedings IEEE; vol. 3. IEEE, 2005; pp. 1917-1928.

Lenders et al. "Location-based trust for mobile user-generated content: applications, challenges and implementations." Proceedings of the 9th workshop on Mobile computing systems and applications; ACM; 2008. (Background); pp. 60-64.

* cited by examiner

CONTROLLING ACCESS TO A HOST SITE USING A PERSONAL IDENTIFICATION VIDEO

BACKGROUND

Individuals utilize websites for multiple reasons. For certain transactions, such as financial transactions, secured access to the host site is desired to prevent unauthorized access. A security system is desired to prevent unauthorized access.

SUMMARY

In accordance with one embodiment, a computer-implemented method for controlling access to a host site is provided. The method includes receiving, receiving an authentication video and processing the authentication video to identify a plurality of scenes. The method also includes identifying a representative image for each of the plurality of scenes and comparing the representative image for each of the plurality of scenes with stored one of a plurality of master images. Based on a determination that a similarity between the representative image for each of the plurality of scenes and the one of the plurality of master images is between a first threshold level and second threshold level, the method includes granting access to the host site.

In accordance with one embodiment, a system for controlling access a host site is provided. The system includes a memory having computer readable instructions and one or more processors for executing the computer readable instructions. The computer-readable instructions include receiving an authentication video and processing the authentication video to identify a plurality of scenes. The computer-readable instructions also include identifying a representative image for each of the plurality of scenes and comparing the representative image for each of the plurality of scenes with stored one of a plurality of master images. Based on a determination that a similarity between the representative image for each of the plurality of scenes and the one of the plurality of master images is between a first threshold level and second threshold level, the computer readable instructions include granting access to the host site.

In accordance with one embodiment, a computer program product for controlling access to a host site is provided. The computer program product includes a computer-readable storage medium having program instructions embodied therewith and the program instructions readable by a processing circuit to cause the processing circuit to perform a method. The method includes receiving an authentication video and processing the authentication video to identify a plurality of scenes. The method also includes identifying a representative image for each of the plurality of scenes and comparing the representative image for each of the plurality of scenes with stored one of a plurality of master images. Based on a determination that a similarity between the representative image for each of the plurality of scenes and the one of the plurality of master images is between a first threshold level and second threshold level, the method includes granting access to the host site.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and methods for securing access to a host site. In exemplary embodiments, when a user registers, or sets up an account, with a host site, the user records a video of several scenes at a location from which the user wishes to restrict access to the host site from. A graphical analysis of the video is performed and a plurality of scenes in the video, and their sequence, are stored for use in controlling access to the host site. After registration, when a user wishes to access the host site, the user must capture a new video that is analyzed to ensure the user is at the authorized location. The analysis of the video is configured to ensure that a previously recorded copy of a video cannot be used to gain access to the secure site.

In one example, a user may capture a video of several scenes from their home office and use this video to control access to a secure website. In the future, the user will only be able to access this secure website from their home office after capturing a video that includes the same sequence of scenes that were provided in the video at the time of registration.

In exemplary embodiments in order for a successful authentication of the scenes in the authentication video against the previously stored sciences, a comparison of the similarity of the scenes should be above a first threshold value but below a second threshold value, which is less than 100%. By not allowing authentication of images that have 100% similarity, the use of a stored copy of a video can be prevented. Likewise, by requiring the similarity to exceed a first threshold value, minor variations in the user's composition of the video allow authentication.

A significant layer of security is provided by utilizing an authentication video as provided because in order to gain access to the host site an unauthorized user would need to have physical access to the space where the authentication video is required to be taken and knowledge of the sequence of the captured scenes. In exemplary embodiments, the access control system can store a number of the user's previous login videos and will reject re-use of an identical video, thus preventing copies of previous videos from being used.

Figure 1:
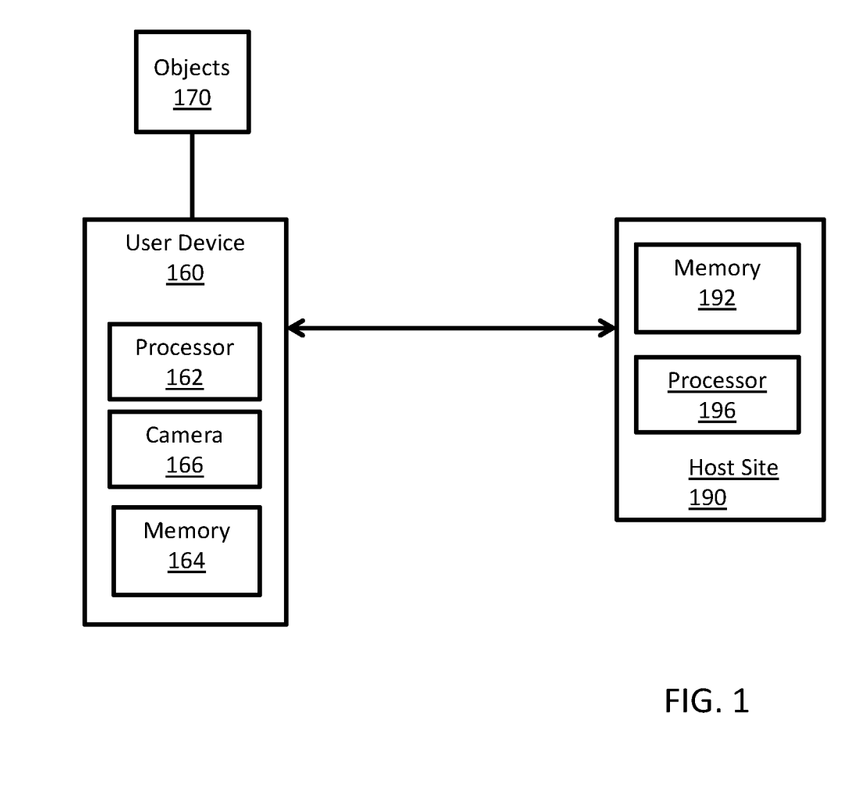
FIG. 1 illustrates a general overview of a system for controlling access to a host site according to one embodiment.

Referring now to FIG. 1, a user device 160 for accessing a host site 190 is shown. The user device 160 may be any type of computing device capable of communicating with host site 190 via a network. For example, the user device 160 can be a processing system such as the one shown in FIG. 5, a laptop mobile computer, a personal data assistant, a tablet, or a smartphone. The user device 160 includes a memory 164, a camera 166 and a processor 162 for controlling the operation of user device 160. The host site 190 can be any site requiring a password or other security feature for access. The host site 190 includes a processor 196 and associated memory 192 which can store information utilized in controlling access to the host site 190. The user device 160 includes a camera 166 for capturing videos and pictures of objects 170.

In exemplary embodiments, the processor 162 of the user device or the processor 196 of the host site is configured to process a video captured by the camera 166 and to store images extracted from the video in either the memory 164 or the memory 192, respectively, for utilization in controlling access to the host site 190.

Figure 2:
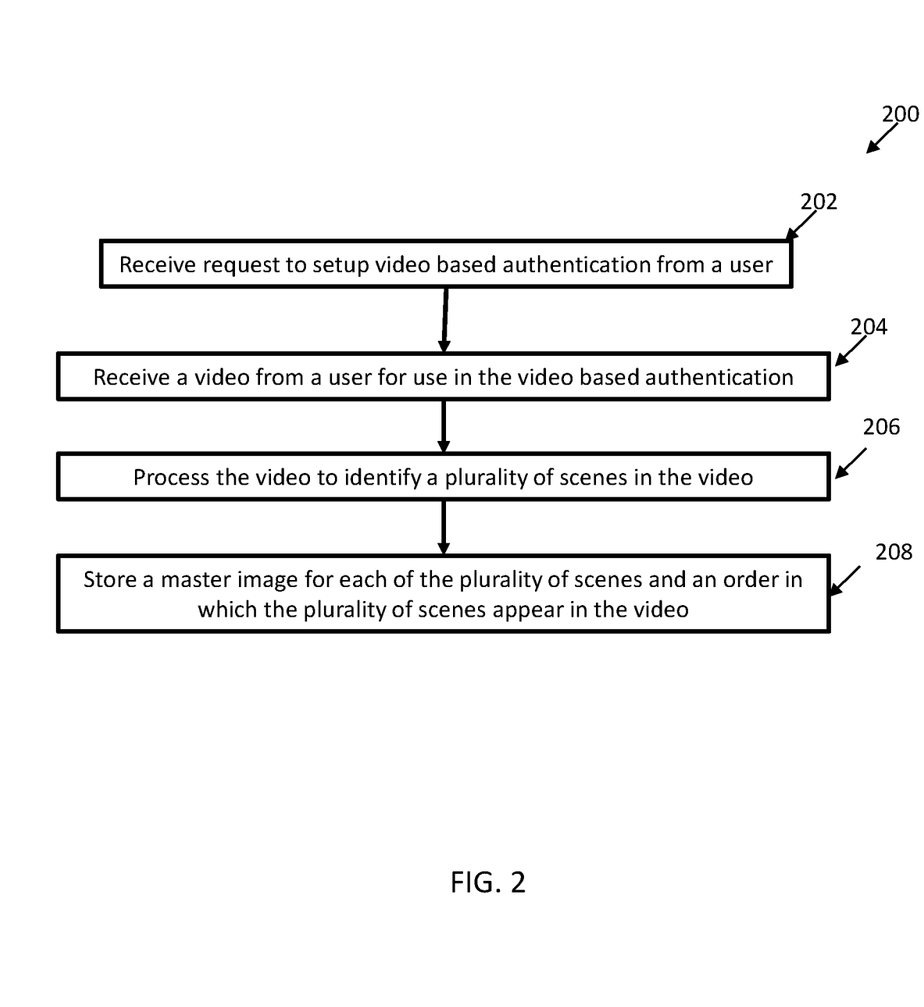
FIG. 2 illustrates a flowchart of a method for setting up a system for controlling access to a host site according to one embodiment.

Referring now to FIG. 2, a flowchart of a method 200 for setting up a system for controlling access to a host site according to one embodiment is shown. As shown at block 202, the method 200 includes receiving a request to setup video based authentication from a user. In exemplary embodiments, the request to setup video based authentication may also be used as part of a multi-factor authentication system to be used for controlling access to a host site. Next, as shown at block 204, the method 200 includes receiving a video from a user for use in the video based authentication. In exemplary embodiments, the video received is captured by the user at a location that the user wants to restrict access to the host site to, this location is referred to herein as an authorized location. In exemplary embodiments, the user can be instructed to record a reasonable length video, for example twenty to sixty seconds, which includes a sequence of scenes in a specific order the user should pause motion and hold the camera steady while recording each scene in the flow a reasonable number of scenes, such as three to ten. Next, as shown at block 206, the method 200 includes processing the video to identify a plurality of scenes in the video. In exemplary embodiments, the video may be processed according to the method shown in FIG. 4. In exemplary embodiments, if the video does not meet minimum identifiable scene content, for example 3 scenes, the user is asked to submit a video with more scene content. After the video is processed, the method 200 includes storing a master image for each of the plurality of scenes and an order in which the plurality of scenes appear in the video.

Figure 3:
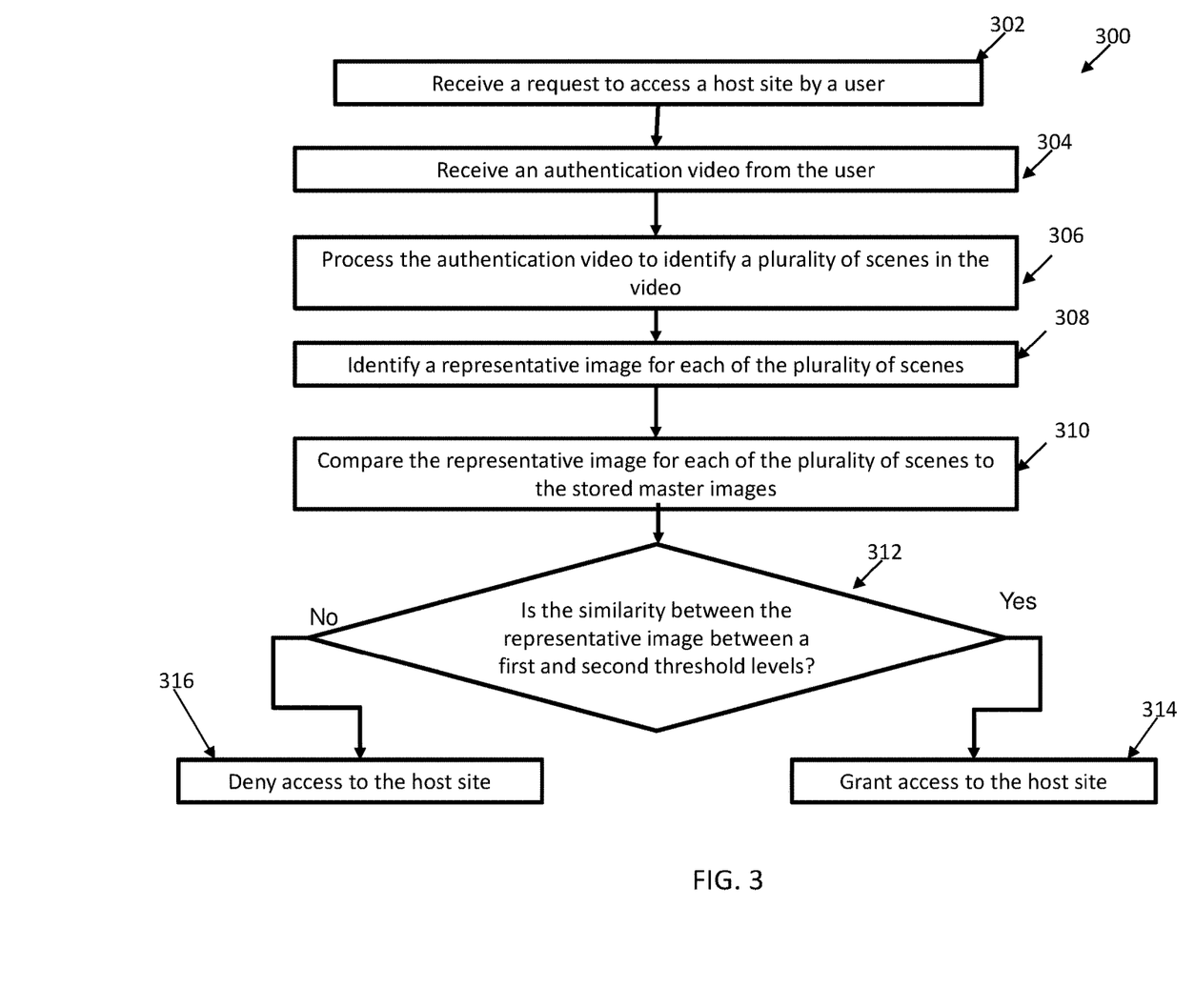
FIG. 3 illustrates a flowchart of a method for accessing a host site using video authentication according to one embodiment.

Referring now to FIG. 3, a flowchart of a method 300 accessing a host site using video authentication according to one embodiment is shown. As shown at block 302, the method 300 includes receiving a request to access the host side by a user. In exemplary embodiments, the request may be part of a multi-factor authentication system by the user. Next, as shown at block 304, the method includes receiving an authentication video from the user. Next, the method 300 includes processing the authentication video to identify a plurality of scenes in the video. In exemplary embodiments, the video may be processed according to the method shown in FIG. 4. Next, as shown at block 308, the method 300 includes identifying a representative image for each of the plurality of scenes in the video. The method 300 also includes comparing the representative image for each of the plurality of scenes to the stored master images, as shown at block 310. In exemplary embodiments, the comparison of the images is performed by using image RGB pixel comparisons, which can provide a percentage similarity score that represents the similarity of the two images. As shown at decision block 312, the method 300 includes determining whether the similarity between the representative image between a first and second threshold levels. In exemplary embodiments, the first threshold level is a minimum amount of similarity that is allowed to authenticate that the two images are a match and the second threshold level is a maximum amount of similarity that is allowed to prevent the re-use of previously captured videos. In one embodiment, the first threshold level is ninety percent and the second threshold level is ninety-nine percent. If the similarity between the representative image between a first and second threshold levels, the method 300 proceeds to block 314 and grants access to the host site. Otherwise, the method 300 proceeds to block 316 and denies access to the host site. In exemplary embodiments, the access control system can be configured to store a plurality of master videos that are compared to the authentication video provided by the user. For example, the access control system can a number of previously submitted authentication videos provided by the user to further prevent the use of stored videos for gaining access to the host site. In one embodiment, once a newly provided video is authenticated it, or images extracted from it, may be added to the database of videos used for authentication.

Figure 4:
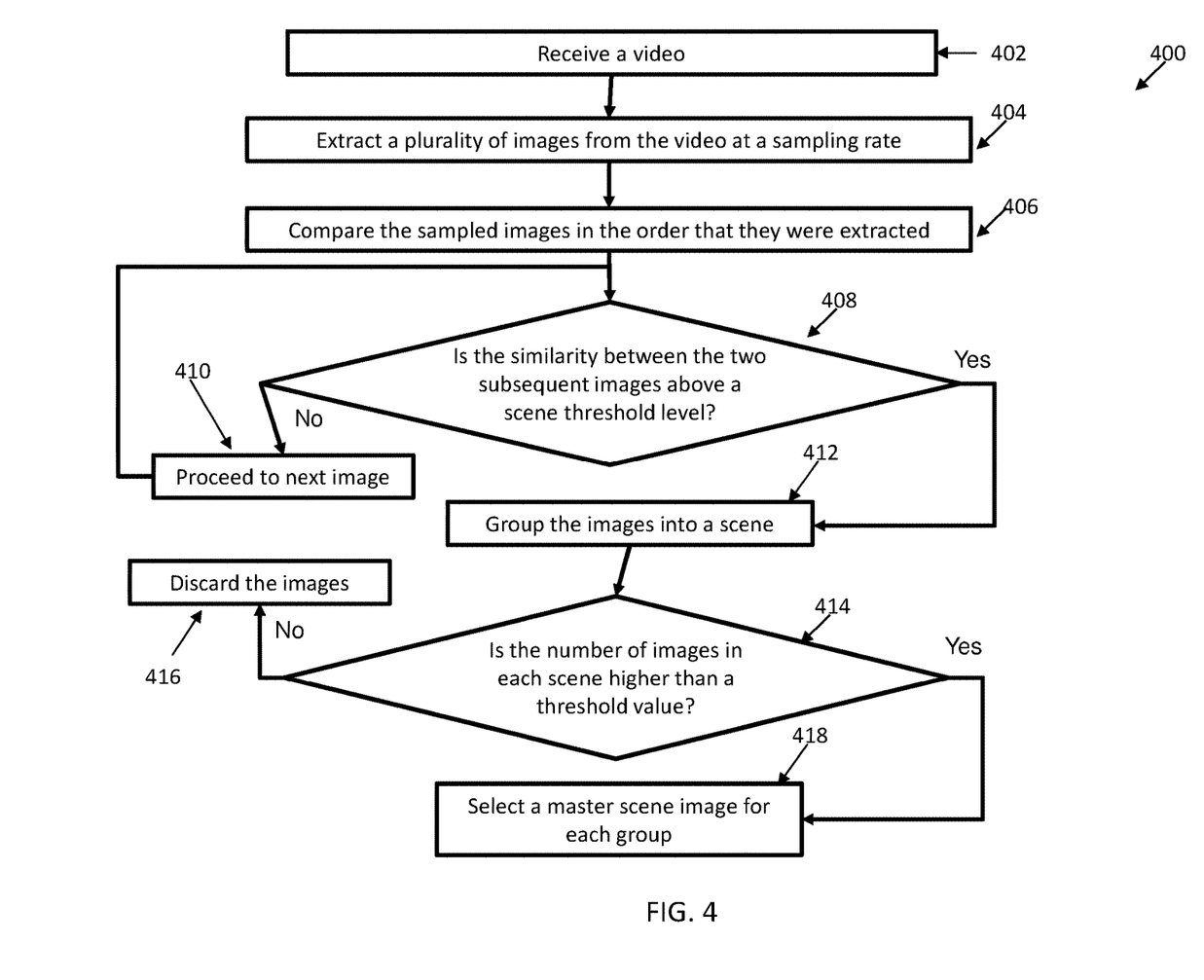
FIG. 4 illustrates a flowchart of a method for processing a video for use in controlling access to a host site according to one embodiment.

Referring now to FIG. 4, a flowchart of a method 400 for processing a video for use in controlling access to a host site according to one embodiment is shown. As shown at block 402, the method 400 includes receiving a video. Next, as shown at block 404, the method 400 includes extracting a plurality of images from the video at a sampling rate. In one embodiment, the video is sampled at a rate of 1 to 3 samples per second to extract a series of static images. Next, as shown at block 406, the method 400 includes comparing the sampled images in the order that they were extracted. In exemplary embodiments, the comparison of the images is performed by using image RGB pixel comparisons, which can provide a percentage similarity score that represents the similarity of the two images. As shown at decision block 408, the method 400 includes determining whether the similarity between the two subsequent images is above a scene threshold level. If subsequent images are determined to be a close-match, i.e., they have a similarity score of greater than ninety percent, the two images should be considered a match and the images are grouped into a scene, as shown at block 412. If the similarity between the two subsequent images is not above a scene threshold level, the method proceeds to block 410 and advances to the next image. After all of the images have been processed, the method 400 proceeds to decision block 414 and determine whether the number of images in each scene is higher than a threshold number. For scene groups that have less than the threshold number of images, the images are discarded, as shown at block 416. However, for scene groups that have at least the threshold number of images, a master scene image for each group is selected, as shown at block 418. In exemplary embodiments, the master scene can be selected using a variety of techniques that include, but are not limited to, taking a mathematical average of all images in the group, selecting an image at random from the group, and selecting a median image from the group based on time of capture.

In exemplary embodiments, the processing of the video can be performed by the host site or by the user device. For example, in one embodiment the host site may receive the video from the user device and can process the video and compare the processed video to one or more previously stored videos. In another embodiment, the user device may capture the video, process the video to extract a representative image for each scene and may provide the representative images to the host site for authentication purposes.

In exemplary embodiments, additional data may be used to prevent the re-use of previously captured video in the authentication process. This data may include metadata embedded in the video, hash function data performed on provided videos and the like. In exemplary embodiments, the user may set up more than one authorized location that can be used to access the secure site and the access control system can store video data for each of the authorized locations.

Figure 5:
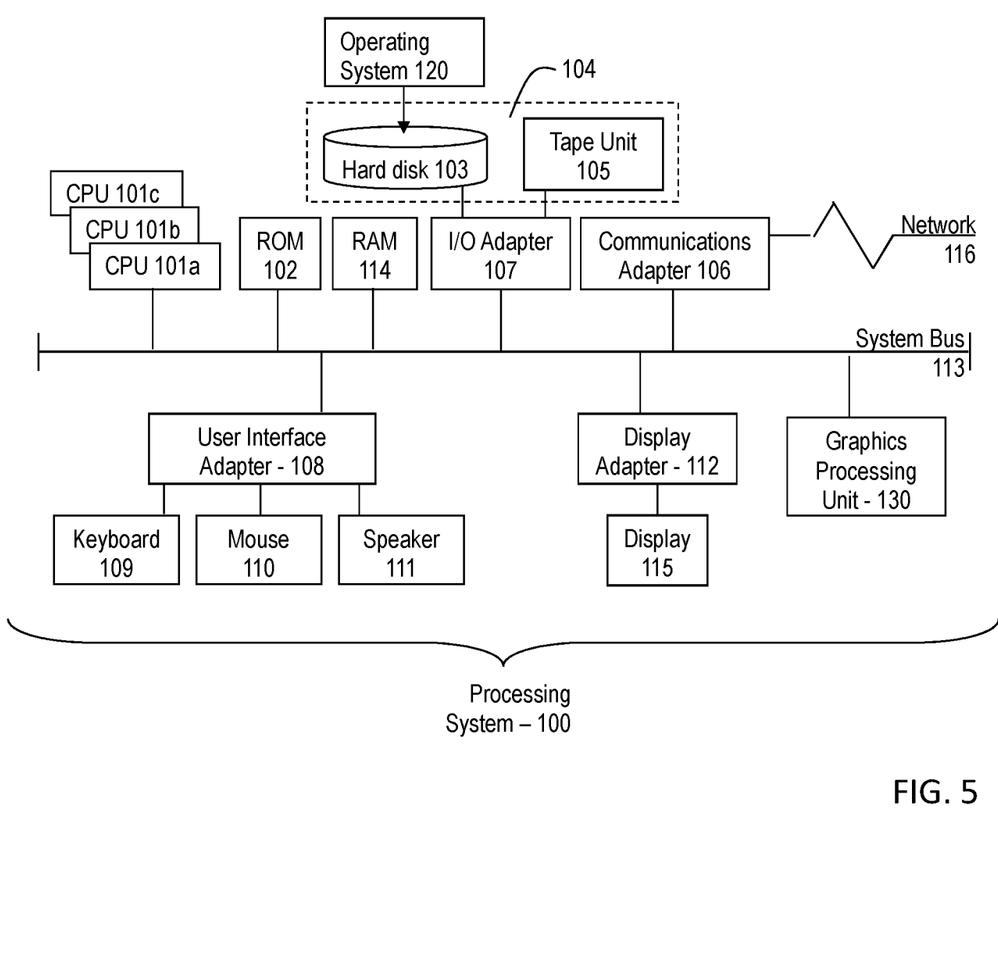
FIG. 5 illustrates a processing system according to an embodiment.

Referring to FIG. 5, there is shown primary computer system 100 according to one or more embodiments. First computing device 160 may have the same configuration as primary computer system 100. The primary computer system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read-only memory (ROM) 102 is coupled to the system bus 113 and may include a basic input/output system (BIOS), which controls certain basic functions of system 100.

FIG. 5 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 5, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), a wireless LAN (WLAN using WiFi), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for controlling access to a host site, the method comprising: receiving, using a processor, an authentication video; processing, using the processor, the authentication video to identify a plurality of scenes; identifying, using the processor, a representative image for each of the plurality of scenes; comparing, using the processor, the representative image for each of the plurality of scenes with stored one of a plurality of master images; and based on a determination that a similarity between the representative image for each of the plurality of scenes and the one of the plurality of master images is between a first threshold level and second threshold level, granting access to the host site, wherein processing the authentication video to identify the plurality of scenes comprises: extracting a plurality of images from the authentication video at a sampling rate; comparing two subsequent images of the plurality of images in an order that they were extracted; based on a determination that a similarity between the two subsequent images are above a scene threshold level, group the two subsequent images into a scene; and based on a determination that a number of images in each said scene is higher than a threshold value, storing the scene as one of the plurality of scenes.

2. The computer-implemented method of claim 1, further comprising denying access to the host site based on a determination that the similarity between the representative image for one of the plurality of scenes and the one of the plurality of master images is below the first threshold level.

3. The computer-implemented method of claim 1, further comprising denying access to the host site based on a determination that the similarity between the representative image for one of the plurality of scenes and the one of the plurality of master images is greater than the second threshold level.

4. The computer-implemented method of claim 1, wherein processing the authentication video to identify the plurality of scenes further comprises based on a determination that the number of images in each scene is less than the threshold value, discarding images in the scene.

5. The computer-implemented method of claim 1, wherein processing the authentication video to identify the plurality of scenes further comprises selecting a master scene image for each of the plurality of scenes.

6. The computer-implemented method of claim 1, wherein comparing the representative image for each of the plurality of scenes with stored one of the plurality of master images includes performing an RGB pixel comparison.

7. The computer-implemented method of claim 1, wherein the plurality of master images were previously obtained from a video provided by a user.

8. A system for controlling access to a host site, the system comprising: a memory having computer readable instructions; and one or more processors, communicatively coupled to the memory, for executing the computer readable instructions, the computer readable instructions comprising: receiving an authentication video; processing the authentication video to identify a plurality of scenes; identifying a representative image for each of the plurality of scenes; comparing the representative image for each of the plurality of scenes with stored one of a plurality of master images; and based on a determination that a similarity between the representative image for each of the plurality of scenes and the one of the plurality of master images is between a first threshold level and second threshold level, granting access to the host site, wherein processing the authentication video to identify the plurality of scenes comprises: extracting a plurality of images from the authentication video at a sampling rate; comparing two subsequent images of the plurality of images in an order that they were extracted; based on a determination that a similarity between the two subsequent images are above a scene threshold level, group the two subsequent images into a scene; and based on a determination that a number of images in each said scene is higher than a threshold value, storing the scene as one of the plurality of scenes.

9. The system of claim 8, wherein the computer readable instructions further comprise denying access to the host site based on a determination that the similarity between the representative image for one of the plurality of scenes and the one of the plurality of master images is below the first threshold level.

10. The system of claim 8, wherein the computer readable instructions further comprise denying access to the host site based on a determination that the similarity between the representative image for one of the plurality of scenes and the one of the plurality of master images is greater than the second threshold level.

11. The system of claim 8, wherein processing the authentication video to identify the plurality of scenes further comprises based on a determination that the number of images in each scene is less than the threshold value, discarding images in the scene.

12. The system of claim 8, wherein processing the authentication video to identify the plurality of scenes further comprises selecting a master scene image for each of the plurality of scenes.

13. The system of claim 8, wherein comparing the representative image for each of the plurality of scenes with stored one of the plurality of master images includes performing an RGB pixel comparison.

14. A computer program product for securing access to a user account on a host site, the computer program product comprising a non-transitory computer-readable storage medium having program instructions embodied therewith, the program instructions readable by a processing circuit to cause the processing circuit to perform a method comprising: receiving an authentication video; processing the authentication video to identify a plurality of scenes; identifying a representative image for each of the plurality of scenes; comparing the representative image for each of the plurality of scenes with stored one of a plurality of master images; and based on a determination that a similarity between the representative image for each of the plurality of scenes and the one of the plurality of master images is between a first threshold level and second threshold level, granting access to the host site, wherein processing the authentication video to identify the plurality of scenes comprises: extracting a plurality of images from the authentication video at a sampling rate; comparing two subsequent images of the plurality of images in an order that they were extracted; based on a determination that a similarity between the two subsequent images are above a scene threshold level, group the two subsequent images into a scene; and based on a determination that a number of images in each saved said scene is higher than a threshold value, storing the scene as one of the plurality of scenes.

15. The computer program product of claim 14, wherein the method further comprises denying access to the host site based on a determination that the similarity between the representative image for one of the plurality of scenes and the one of the plurality of master images is below the first threshold level.

16. The computer program product of claim 14, wherein the method further comprises denying access to the host site based on a determination that the similarity between the representative image for one of the plurality of scenes and the one of the plurality of master images is greater than the second threshold level.

17. The computer program product of claim 14, wherein processing the authentication video to identify the plurality of scenes further comprises based on a determination that the number of images in each scene is less than the threshold value, discarding images in the scene.

\* \* \* \* \*